Patented July 13, 1954

2,683,742

UNITED STATES PATENT OFFICE 2,683,742

N,N-DISUBSTITUTED ω-ARYLMETHOXY-ω-ARYLALKYLAMINE DERIVATIVES

John W. Cusic, Skokie, Ill., assignor to G. D. Searle & Co., Chicago, Ill., a corporation of Illinois No Drawing. Application February 23, 1951, Serial No. 212,507

13 Claims. (Cl. 260—567.6)

The present invention relates to a group of new organic ethers, and more specifically to N,N-disubstituted ω-arylmethoxy-ω-arylalkylamine derivatives, to their salts and to methods for their production.

By this invention I have provided new compositions of matter which may be represented by the following structural formula

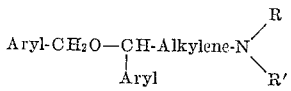

wherein the radical

is defined as a member of the class comprising di-aliphatically substituted amino radicals and nitrogen-containing heterocyclic radicals attached to the alkylene radical through a nitrogen in the heterocycle.

In the foregoing structural formula, the aryl groups may be such radicals as phenyl, ortho-, meta-, and para-tolyl, ortho-, meta-, and para-anisyl, methylenedioxyphenyl, naphthyl and the like. The alkylene group is derived from a bivalent saturated hydrocarbon radical of no more than six carbon atoms, such as methylene, ethylene, propylene, butylene, amylene, and polymethylene radicals such as trimethylene, tetramethylene, pentamethylene, and hexamethylene. Among the radicals which R and R' may represent are such lower aliphatic groups as methyl, ethyl, propyl, butyl, amyl, and hexyl, and the corresponding chloroalkyl, bromoalkyl, iodoalkyl, hydroxyalkyl, and alkoxyalkyl groups, wherein the propyl, butyl, amyl and hexyl groups may be either of the straight-chain or branched chain type.

The organic bases of the foregoing type form salts with a variety of inorganic and strong organic acids including sulfuric, phosphoric, hydrochloric, hydrobromic, sulfamic, citric, oxalic, ascorbic, and related acids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethyl sulfate, diethyl sulfate, methyl benzene sulfonate, ethyl toluene sulfonate, ethylene chlorohydrin, propylene chlorohydrin, allyl bromide, methallyl bromide and crotyl bromide.

The object of this invention is to provide novel ethers of the type indicated above. These ethers are valuable intermediates in organic synthesis. They have been found to possess a number of useful pharmacodynamic properties. Thus they possess a pronounced effect on the circulatory system and are promising hypotensive agents. The acid addition salts affect the excretory function of the kidney. These compounds also possess a spasmolytic action as demonstrated by their effect on the isolated intestine stimulated by such spasmogens as histamine, barium chloride, and acetylcholine. The salts of certain of these compounds are useful as active ingredients in parasiticidal compositions of matter.

One of the convenient methods of preparing these compounds is to react a solution of an alcohol of the type

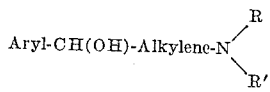

wherein the symbols are defined as hereinabove, in an inert solvent, such as a lower aromatic hydrocarbon, with a suspension of an active sodium compound, such as sodium hydride, in the same solvent under anhydrous conditions and preferably in an inert atmosphere; the resultant sodium compound is then reacted by heating with an appropriate arylmethyl halide and the condensation product is isolated in the usual way.

My invention will be described more fully in conjunction with the following examples. It should be understood, however, that these examples are given by way of illustration only and that the invention is not to be construed as limited in spirit or in scope by the details set forth. It will be apparent to those skilled in the art that many modifications in materials and methods may be made without departing from the invention. In each of these examples, temperatures are given uncorrected in degrees centigrade (° C.), amounts of materials in parts by weight, and pressures in millimeters (mm.) of mercury.

EXAMPLE 1

*N,N-dimethyl-β-benzyloxyphenethylamine*

A solution of 825 parts of α-dimethylaminomethylbenzyl alcohol in 300 parts of toluene is added gradually to a suspension of 120 parts of sodium hydride in 130 parts of toluene under a nitrogen atmosphere. When the initial reaction has subsided, the mixture is heated and maintained at refluxing temperature with stirring for ten hours. After cooling, a solution of 632 parts of benzyl chloride is added gradually, and the resultant mixture is heated to refluxing temperature for another ten hours. The reaction product is extracted with dilute hydrochloric acid, the extract rendered alkaline with a dilute solution of sodium hydroxide, and extracted with ether. The ether extract is dried over anhydrous potassium carbonate, filtered, and evaporated. The resultant N,N-dimethyl-β-benzyloxyphenethylamine boils at about 158–160° C. at 2 mm. pressure. It has the following structural formula

C₆H₅—CH₂O—CH(C₆H₅)—CH₂—N(CH₃)₂

The hydrochloride is obtained by treatment of an ethereal solution of the base with alcoholic hydrogen chloride. The resultant precipitate, recrystallized from a mixture of isopropanol and ether, melts at about 175–176° C.

EXAMPLE 2

*N,N-diethyl-β-benzyloxyphenethylamine*

To a suspension of 120 parts of sodium hydride in 430 parts of anhydrous toluene are added 965 parts of α-diethylaminomethylbenzyl alcohol. The reaction is carried on under a nitrogen atmosphere, and the alcohol is added at a slow rate to avoid an excessive reaction rate. The reaction is completed by heating to refluxing temperature for ten hours. After cooling, a solution of 635 parts of benzyl chloride in toluene is added gradually and the condensation is completed by heating to refluxing temperature for twelve hours. Ethanol and dilute aqueous hydrochloric acid are then added to the reaction mixture. The aqueous layer is separated, rendered alkaline and extracted with ether. The ether layer is dried over anhydrous potassium carbonate, filtered, and evaporated. The N,N-diethyl-β-benzyloxyphenethylamine distills at about 208–210° C. at 15 mm. pressure. The hydrochloride is prepared by treatment of a dry ethereal solution of the base with an equivalent of alcoholic hydrogen chloride. The oily precipitate solidifies within a few minutes. Upon crystallization from isopropanol, it melts at about 137–138° C.

EXAMPLE 3

*(β-benzyloxy-β-phenyl) ethyl-(β-hydroxyethyl) diethylammonium bromide*

283 parts of N,N-diethyl-β-benzyloxyphenethylamine are heated with 250 parts of ethylene bromohydrin in 400 parts of butanone at refluxing temperature for twelve hours. Upon addition of ether to the cooled mixture, an oily precipitate forms which crystallizes upon storing at 0° C. The (β-benzyloxy-β-phenyl)ethyl-(β-hydroxyethyl)diethylammonium bromide is collected on a filter and washed with warm butanone. It melts at about 119–120° C. and has the following structural formula

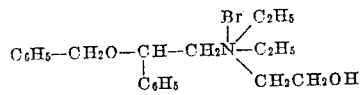

EXAMPLE 4

*N,N-dimethyl-γ-benzyloxy-γ-phenylpropylamine*

A solution of 537 parts of α-(β-dimethylaminoethyl)-benzyl alcohol in 200 parts of toluene is added gradually to a suspension of 72 parts of sodium hydride in 60 parts of toluene. The mixture is then heated at refluxing temperature for ten hours. The cooled reaction product is condensed with a solution of 279 parts of benzyl chloride in toluene which is added slowly. After heating to refluxing temperature for 40 hours the reaction mixture is cooled, treated with ethanol and then with dilute hydrochloric acid. A small amount of precipitate is removed by filtration. The hydrogen chloride layer of the filtrate is separated, rendered alkaline, and extracted with ether. The ethereal layer is dried over anhydrous potassium carbonate, filtered, and evaporated. The N,N-dimethl-γ-benzyloxy-γ-phenylpropylamine distills at 156–161° C. at 2 mm. pressure. It has the structural formula

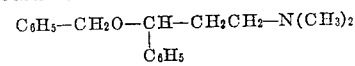

The hydrochloride is obtained by treatment of the dry ethereal solution of the base with alcoholic hydrogen chloride. Recrystallized from acetone, it melts at about 155–156° C.

EXAMPLE 5

*4-[β-(2-naphthyl)-β-(p-anisylmethoxyethyl]morpholine*

Under a nitrogen atmosphere, a solution of 514 parts of α - (2 - naphthyl) - 4 - morpholinoethanol (cf. T. Immediata and A. R. Day, J. Org. Chem. 5, 512; 1940) in 3000 parts of toluene is gradually added to a suspension of 48 parts of sodium hydride in 2000 parts of toluene under anhydrous conditions. The mixture is heated for ten hours under reflux. After cooling a solution of 313 parts of p-methoxybenzyl chloride in toluene is added slowly, and the mixture heated at refluxing temperature for two days. Upon addition of ethanol and dilute hydrochloric acid, a precipitate forms which is removed by filtration. The hydrochloric acid layer of the filtrate is rendered alkaline by addition of sodium hydroxide and extracted with ether. The ether extract is dried over anhydrous potassium carbonate, filtered and evaporated to form the oily 4 - [β - (2 - naphthyl) - β - (p - anisylmethoxy) - ethyl]morpholine. The hydrochloride is obtained in the form of white needles by treatment of a dry ethereal solution with alcoholic hydrochloric acid. It has the structural formula

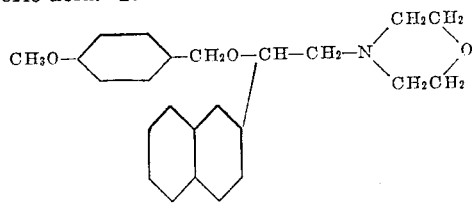

EXAMPLE 6

*1-[δ-(3,4-methylenedioxyphenyl)-δ-(o-tolylmethoxy)butyl]-piperidine*

To a suspension of 24 parts of sodium hydride in 500 parts of toluene is added gradually a solution of 277 parts of α-(3,4-methylenedioxyphenyl)-1-piperidinebutanol in 2000 parts of toluene. The mixture is heated for ten hours under reflux and after cooling, a solution of 141 parts of (α-chloro)-o-xylene in toluene is added, and after subsidence of the strongly exothermic reaction, the condensation is completed by heating under reflux temperature for 24 hours. The entire reaction is advantageously conducted under nitrogen. The mixture is treated with ethanol and dilute aqueous hydrochloric acid. After filtration of a small amount of precipitate, the aqueous layer is rendered alkaline and extracted with ether. The ethereal layer is dried over anhydrous potassium carbonate, filtered, and evaporated to form the oily 1-[δ-(3,4-methylenedioxyphenyl)-δ-(o-tolylmethoxy)butyl]piperidine.

The crystalline methobromide is obtained by treatment of 19 parts of the base with 10 parts of methyl bromide in 50 parts of butanone, heating at refluxing temperature for twelve hours, treatment with ether and storing at 0° C. It has the structural formula

I claim:
1. The new group of compounds consisting of the N,N-disubstituted ω-arylmethoxy-ω-arylalkylamine derivatives of the structural formula

$$Ar-CH_2O-\underset{Ar'}{\underset{|}{C}H}-Alkylene-N\underset{R'}{\overset{R}{\diagup}}$$

and salts thereof, wherein Ar and Ar' are members of the class consisting of aryl hydrocarbon radicals containing six to ten carbon atoms inclusive and lower alkoxyphenyl radicals; Alkylene is a lower alkylene radical and the radical NRR' is a member of the class consisting of lower alkyl substituted amino radicals, lower hydroxyalkyl substituted amino radicals, piperidino and morpholino radicals.

2. The N,N-disubstituted-ω-arylmethoxy-ω-aryl-alkylamines of the structural formula $$Ar-CH_2O-\underset{Ar'}{\underset{|}{C}H}-Alkylene-N\underset{R'}{\overset{R}{\diagup}}$$

wherein Ar and Ar' are aryl hydrocarbon radicals containing six to ten carbon atoms inclusive, Alkylene is a lower alkylene radical and wherein R and R' are lower alkyl radicals.

3. The N,N-disubstituted-ω-benzyloxy-ω-phenyl-alkylamines of the structural formula $$C_6H_5-CH_2O-\underset{C_6H_5}{\underset{|}{C}H}-Alkyene-NRR'$$

wherein R and R' are lower alkyl radicals and Alkylene is a lower alkylene radical.

4. The N,N-dialkyl-β-benzyloxyphenethylamines of the structural formula $$C_6H_5-CH_2O-\underset{C_6H_5}{\underset{|}{C}H}-CH_2N(Alkyl)_2$$

wherein Alkyl is a lower alkyl radical.

5. N,N-dimethyl-β-benzyloxyphenethylamine.
6. N,N-diethyl-β-benzyloxyphenethylamine.

7. The N,N-dialkyl-γ-benzyloxy-γ-phenylpropylamines of the structural formula $$C_6H_5-CH_2O-\underset{C_6H_5}{\underset{|}{C}H}-CH_2-CH_2-NR'R''$$

wherein R' and R'' are lower alkyl radicals.

8. N,N-dimethyl-γ-benzyloxy-γ-phenylpropylamine.

9. The quaternary salts of N,N-dialkyl-ω-benzyloxy-ω-phenylalkylamines of the structural formula $$C_6H_5-CH_2O-\underset{C_6H_5}{\underset{|}{C}H}-Alkylene-NR'R''·RX$$

wherein Alkylene is a lower alkylene radical, R' and R'' are lower alkyl radicals, R is a lower hydroxyalkyl radical and X is one equivalent of an anion.

10. The quaternary salts of N,N-dialkyl-β-benzyloxyphenethylamines of the structural formula $$C_6H_5-CH_2O-\underset{C_6H_5}{\underset{|}{C}H}-CH_2-NR'R''·RX$$

wherein R' and R'' are lower alkyl radicals, R is a lower hydroxyalkyl radical and X is one equivalent of an anion.

11. The (β-benzyloxy-β-phenyl)ethyl-(β-hydroxyethyl)diethylammonium halides of the structural formula 12. The quaternary salts of the N,N-dialkyl-ω-benzyloxy-ω-phenylalkylamines of the structural formula $$C_6H_5-CH_2O-\underset{C_6H_5}{\underset{|}{C}H}-Alkylene-NR'R''·RX$$

wherein Alkylene is a lower alkylene radical, R, R' and R'' are lower alkyl radicals and X is one equivalent of an anion.

13. The quaternary salts of N,N-dialkyl-β-benzyloxyphenethylamines of the structural formula $$C_6H_5-CH_2O-\underset{C_6H_5}{\underset{|}{C}H}-CH_2-NR'R''·RX$$

wherein R, R' and R'' are lower alkyl radicals and X is a halide ion.

References Cited in the file of this patent
UNITED STATES PATENTS

| Number | Name | Date |
|---|---|---|
| 2,567,351 | Rieverschl | Sept. 11, 1951 |
| 2,577,234 | Cusic | Dec. 4, 1951 |

FOREIGN PATENTS

| Number | Country | Date |
|---|---|---|
| 930,825 | France | Sept. 1, 1947 |